(No Model.)
C. W. COLLINS.
CEMENT FOR PIPE JOINTS.
No. 352,449. Patented Nov. 9, 1886.
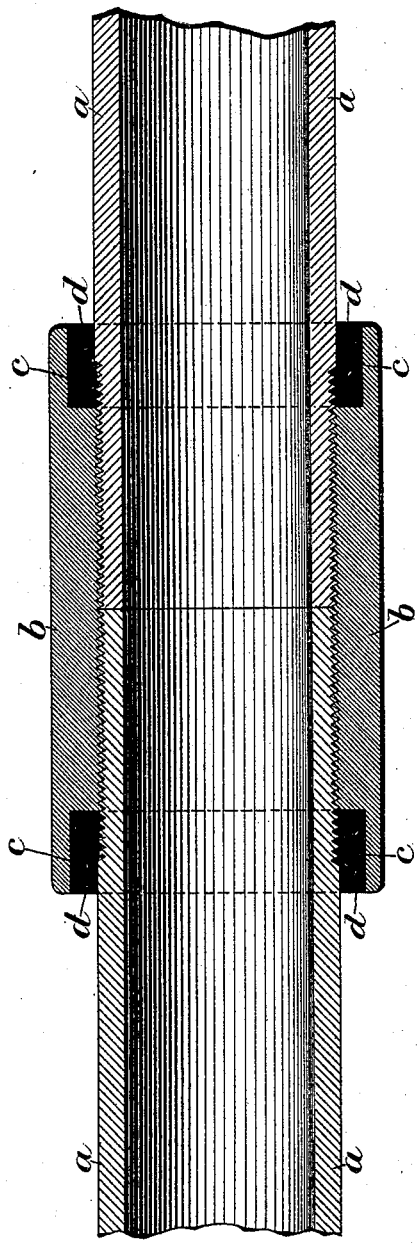
Witnesses.
Inventor.
Charles W. Collins
by his attys
Bakewell & Kerr

UNITED STATES PATENT OFFICE.

CHARLES W. COLLINS, OF ALLEGHENY CITY, ASSIGNOR OF ONE-HALF TO HARRY H. HOOTON, OF PITTSBURG, PENNSYLVANIA.

CEMENT FOR PIPE-JOINTS.

SPECIFICATION forming part of Letters Patent No. 352,449, dated November 9, 1886.

Application filed July 6, 1886. Serial No. 207,166. (No model.)

*To all whom it may concern:*

Be it known that I, CHARLES W. COLLINS, of Allegheny City, in the county of Allegheny and State of Pennsylvania, have invented a new and useful Improvement in Cement for Pipe-Joints; and I do hereby declare the following to be a full, clear, and exact description thereof.

My invention relates to the joints of pipes for conducting and distributing gas and other fluid bodies, and particularly natural gas, on account of its light gravity and the high pressure at which it is admitted to the pipes.

The object of my invention is to secure a tight impervious joint.

To enable others skilled in the art to make and use my invention, I will now describe it by reference to the accompanying drawing, which is a longitudinal section of a well-known form of natural-gas-pipe joint, *a a* being two contiguous sections of gas-pipe; *b*, a coupling-sleeve; and *c* is a recess at each end of the sleeve for containing cement or packing to seal the joint.

In applying my invention to the joint above described, or any other form of joint, I proceed as follows, viz: I take of a good quality of plaster-of-paris—a material composed of sulphate of lime—a sufficient amount to make the given joint. I add to this enough of lime-water (made by drawing off the supernatant liquid from the top of a common slaking-bin after having slaked a bed of lime) to mix the plaster-of-paris into a plastic condition, sufficient for my use. I add the lime-water with the object of neutralizing any free acid that there may be in the plaster-of-paris, which often contains free sulphuric and perhaps other acids, so that it will not corrode the iron to which it is applied. I then coat the surface of the iron with gum-shellac, which I prefer, or with paraffine or asphalt varnish, or other similar substance, for the purpose of giving the iron a coating which will be temporarily impervious to the action of the moist plaster, my object being to protect the iron from the action of the moist mixture until the plaster has "set" and becomes dry, for I find that, owing to the sulphate of lime being almost always, in the commercial article, slightly acid in its action when wet, it is necessary, to prevent the iron from rusting, to protect it until after the plaster dries. I find, further, that after the plaster made in the way I have set forth becomes dried, it has no further action on the iron, but will of itself protect and prevent its becoming oxidized. After coating the metal surfaces of the recesses *c* with the coating of shellac or other suitable material impervious to water, I fill the recess with the cement, and when it is set I preferably coat or varnish the outer surface of the cement *d* with the impervious material, to protect it from the action of the air and water.

My improved cement and method of applying the same to the joint give me a strong, hard, gas-tight, permanent joint. It is cheap and easily applied.

What I claim as my invention, and desire to secure by Letters Patent, is—

1. The method of making pipe-joints, consisting in coating the surfaces of the joints with an impervious material and then filling the joint with a plaster composed of plaster-of-paris and lime-water, substantially as and for the purposes described.

2. A cement for pipe-joints, composed of plaster-of-paris and lime-water, substantially as and for the purposes described.

In testimony whereof I have hereunto set my hand this 26th day of June, A. D. 1886.

CHARLES W. COLLINS.

Witnesses:
J. K. SMITH,
R. H. WHITTLESEY.